US010326653B2

(12) United States Patent
Wu et al.

(10) Patent No.: US 10,326,653 B2
(45) Date of Patent: Jun. 18, 2019

(54) METHOD FOR UPGRADING NETWORK FUNCTIONS VIRTUALIZATION APPLICATION, SERVICE FORWARDING METHOD, AND APPARATUS

(71) Applicant: Huawei Technologies Co., Ltd., Shenzhen (CN)

(72) Inventors: Xin Wu, Shenzhen (CN); Lei Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 15/458,358

(22) Filed: Mar. 14, 2017

(65) Prior Publication Data

US 2017/0187572 A1    Jun. 29, 2017

Related U.S. Application Data

(63) Continuation of application No. PCT/CN2015/083385, filed on Jul. 6, 2015.

(30) Foreign Application Priority Data

Nov. 12, 2014    (CN) .......................... 2014 1 0634787

(51) Int. Cl.
*H04L 12/24*    (2006.01)
*H04L 29/08*    (2006.01)
(Continued)

(52) U.S. Cl.
CPC ............ *H04L 41/082* (2013.01); *H04L 29/08* (2013.01); *H04L 41/0806* (2013.01);
(Continued)

(58) Field of Classification Search
CPC ... H04L 41/082; H04L 41/0896; H04L 43/50; H04L 41/0843; H04L 41/0806;
(Continued)

(56) References Cited

U.S. PATENT DOCUMENTS 8,839,222 B1 * 9/2014 Brandwine ......... G06F 11/3668
717/168
9,645,899 B1 * 5/2017 Felstaine ............. G06F 11/2002
(Continued)

FOREIGN PATENT DOCUMENTS

CN    1684427 A    10/2005
CN    102349052 A    2/2012
(Continued)

OTHER PUBLICATIONS

Machine Translation and Abstract of Chinese Publication No. CN1684427, Oct. 19, 2005, 18 pages.
(Continued)

*Primary Examiner* — Philip J Chea
*Assistant Examiner* — Wuji Chen
(74) *Attorney, Agent, or Firm* — Conley Rose, P.C.

(57) ABSTRACT

A method for upgrading a network functions virtualization application includes creating, by a virtualized infrastructure manager (VIM), a network resource according to an upgrade plan for the network functions virtualization application; creating, by the VIM, a virtual machine for a new-version virtualized network function (VNF) according to the upgrade plan; configuring, by the VIM, the virtual machine on a test network according to the network resource; performing, by the VIM, upgrade configuration on the virtual machine according to an upgrade configuration script to obtain the new-version VNF; and switching, by an NFV orchestrator, an earlier-version VNF to the new-version VNF after determining that a function test of the new-version VNF on the test network is successful. In the embodiments of the present disclosure, an automated upgrade procedure and upgrade steps for a network functions virtualization application are defined, so that upgrading
(Continued)

the network functions virtualization application can be automated.

18 Claims, 10 Drawing Sheets

(51) Int. Cl.
*H04L 12/803* (2013.01)
*H04L 12/26* (2006.01)

(52) U.S. Cl.
CPC ...... *H04L 41/0843* (2013.01); *H04L 41/0896* (2013.01); *H04L 41/145* (2013.01); *H04L 43/50* (2013.01); *H04L 47/125* (2013.01); *H04L 41/0859* (2013.01)

(58) Field of Classification Search
CPC ..... H04L 41/145; H04L 47/125; H04L 29/08; H04L 41/0859
See application file for complete search history.

(56) References Cited

U.S. PATENT DOCUMENTS

| | | |
|---|---|---|
| 10,027,569 B1* | 7/2018 | Ur .......................... H04L 43/50 |
| 2012/0011496 A1* | 1/2012 | Shimamura ......... G06F 9/44521 717/170 |
| 2014/0201374 A1* | 7/2014 | Ashwood-Smith ..... H04L 49/70 709/226 |
| 2014/0241247 A1 | 8/2014 | Kempf et al. |
| 2015/0082308 A1* | 3/2015 | Kiess ................... G06F 9/5072 718/1 |
| 2015/0381465 A1* | 12/2015 | Narayanan ............ H04L 43/062 709/224 |

FOREIGN PATENT DOCUMENTS

| | | |
|---|---|---|
| CN | 102937925 A | 2/2013 |
| CN | 104410672 A | 3/2015 |
| EP | 2916488 A1 | 9/2015 |

OTHER PUBLICATIONS

Machine Translation and Abstract of Chinese Publication No. CN104410672, Mar. 11, 2015, 20 pages.
Foreign Communication From a Counterpart Application, PCT Application No. PCT/CN2015/083385, English Translation of International Search Report dated Oct. 10, 2015, 2 pages.
Foreign Communication From a Counterpart Application, PCT Application No. PCT/CN2015/083385, English Translation of Written Opinion dated Oct. 10, 2015, 6 pages.
Network Function Virtualisation (NFV); Resiliency Requirements, Draft ETSI GS NFV-REL 001, V0.2.4, Oct. 2014, 82 pages.
Network Functions Virtualisation (NFV); Virtual Network Functions Architecture, Draft ETSI GS NFV-SWA 001, V0.2.3, Oct. 2014, 96 pages.
"Network Functions Virtualization (NFV) Management and Orchestration," GS NFV-MAN 001, V0.7.0, Oct. 2014, part 1, 100 pages.
"Network Functions Virtualization (NFV) Management and Orchestration," GS NFV-MAN 001, V0.7.0, Oct. 2014, part 2, 98 pages.
Foreign Communication From a Counterpart Application, European Application No. 15858367.4, Extended European Search Report dated Aug. 8, 2017, 11 pages.

* cited by examiner

US 10,326,653 B2

METHOD FOR UPGRADING NETWORK FUNCTIONS VIRTUALIZATION APPLICATION, SERVICE FORWARDING METHOD, AND APPARATUS

CROSS-REFERENCE TO RELATED APPLICATIONS

This application is a continuation of International Application No. PCT/CN2015/083385, filed on Jul. 6, 2015, which claims priority to Chinese Patent Application No. 201410634787.7, filed on Nov. 12, 2014, both of which are hereby incorporated by reference in their entireties.

TECHNICAL FIELD

The present disclosure relates to the field of network functions virtualization, and more specifically, to a method for upgrading a network functions virtualization (NFV) application, a service forwarding method, and an apparatus.

BACKGROUND

NFV is to use a virtualization technology in the evolving information technology (IT) field to uniformly implement many types of network devices on high-capacity servers, switches, and storage devices that are compliant with an industry standard, so as to change a manner in which a network operator constructs and operates a network and a network service (NS). NFV implements network functions using software that can run on a series of hardware servers that is compliant with the industry standard, so as to change a network architecture. In addition, the software can be dynamically moved to or instantiated in different locations on a network as required, and no new device needs to be installed, and therefore, network operation is also changed.

NFV enables a function of a network to be independent of special-purpose hardware by means of decoupling between software and hardware and function abstraction. In this way, resources can be shared fully and flexibly, a new service can be quickly developed and deployed, and based on actual service requirements, capabilities such as automatic deployment, auto scaling, and fault isolation and self-healing can be implemented for an application.

When an application in NFV needs to be upgraded, an upgrade sequence and procedure generally cannot be arranged flexibly, and an upgrade process is completed manually for lack of an automated procedure.

SUMMARY

Embodiments of the present disclosure provide a method for upgrading an application, so as to implement an automated procedure for upgrading a network functions virtualization application.

According to a first aspect, a method for upgrading an NFV application is provided, where the method includes creating, by a virtualized infrastructure manager (VIM), a network resource according to an upgrade plan for the NFV application; creating, by the VIM, a virtual machine for a new-version VNF according to the upgrade plan; configuring, by the VIM, the virtual machine on a test network according to the network resource; performing, by the VIM, upgrade configuration on the virtual machine according to an upgrade configuration script to obtain the new-version VNF; and switching, by an NFV orchestrator (NFVO), an earlier-version VNF to the new-version VNF after determining that a function test of the new-version VNF on the test network is successful.

With reference to the first aspect, in a first possible implementation manner, before the creating, by the VIM, a virtual machine for the new-version VNF according to the upgrade plan, the method further includes instructing, by the NFVO according to the upgrade plan, a virtualized network function manager (VNFM) to call a createVNF interface to create the new-version VNF, where an input parameter of the createVNF interface includes at least a version number of the new-version VNF; and the creating, by the VIM, a virtual machine for the new-version VNF according to the upgrade plan includes creating, by the VIM, the virtual machine for the new-version VNF according to the instruction of the VNFM.

With reference to the first aspect or the first possible implementation manner, in a second possible implementation manner, the switching, by an NFVO, the earlier-version VNF to the new-version VNF includes instructing, by the NFVO, the VIM to switch a network configuration of the new-version VNF, from the test network to a production network on which the earlier-version VNF is located; instructing, by the NFVO, the VIM to switch a database corresponding to the earlier-version VNF to a database corresponding to the new-version VNF; instructing, by the NFVO, the VIM to configure, in an earlier service load forwarding point corresponding to the earlier-version VNF, information about the new-version VNF, so that the earlier service load forwarding point manages traffic forwarding and load balancing of both the new-version VNF and the earlier-version VNF; and instructing, by the NFVO, the VIM to switch a service of the earlier-version VNF to the new-version VNF.

With reference to the first aspect or the second possible implementation manner, in a third possible implementation manner, the instructing, by the NFVO, the VIM to configure, in an earlier service load forwarding point corresponding to the earlier-version VNF, information about the new-version VNF includes instructing, by the NFVO, the VIM to call an AddNewVAPPToVLB interface to configure, in the earlier service load forwarding point corresponding to the earlier-version VNF, the information about the new-version VNF.

With reference to the second or the third possible implementation manner, in a fourth possible implementation manner, after the instructing, by the NFVO, the VIM to switch a database corresponding to the earlier-version VNF to a database corresponding to the new-version VNF, the method further includes, when a data model of the new-version VNF does not change relative to a data model of the earlier-version VNF, storing, by the VIM, data of the new-version VNF in the database corresponding to the earlier-version VNF; or when a data model of the new-version VNF changes relative to a data model of the earlier-version VNF, creating, by the VIM, a new database for the new-version VNF, and storing data of the earlier-version VNF in the new database.

With reference to the second or the fourth possible implementation manner, in a fifth possible implementation manner, after the instructing, by the NFVO, the VIM to switch a service of the earlier-version VNF to the new-version VNF, the method further includes instructing, by the VIM according to the instruction delivered by the NFVO, the earlier service load forwarding point to determine a connection status of a service request according to a stored connection record when the earlier-version VNF is stateful; and sending, by the earlier service load forwarding point, the service request to the earlier-version VNF when determining that the service request has a stateful connection; or sending, by the earlier service load forwarding point, the service request to the new-version VNF when determining that the service request has a stateless connection.

With reference to the second or the fifth possible implementation manner, in a sixth possible implementation manner, the instructing, by the NFVO, the VIM to switch a service of the earlier-version VNF to the new-version VNF includes instructing, by the NFVO, the VIM to call a StartGracefulSwitchover interface to start a service switching procedure between the new-version VNF and the earlier-version VNF.

With reference to any one of the first aspect, or the first to the sixth possible implementation manners, in a seventh possible implementation manner, before the switching, by an NFVO, the earlier-version VNF to the new-version VNF, the method further includes creating, by the VIM, a new service load forwarding point according to the upgrade plan; and configuring, by the VIM and in the new service load forwarding point, the information about the new-version VNF, so that the new service load forwarding point manages traffic forwarding and load balancing of the new-version VNF.

With reference to the seventh possible implementation manner, in an eighth possible implementation manner, after the instructing, by the NFVO, the VIM to configure, in an earlier service load forwarding point corresponding to the earlier-version VNF, information about the new-version VNF, the method further includes obtaining, by the VIM, the information about the new-version VNF from the new service load forwarding point; and configuring, by the VIM and in the earlier service load forwarding point, the information about the new-version VNF, so that the earlier service load forwarding point manages the new-version VNF and the earlier-version VNF.

With reference to the eighth possible implementation manner, in a ninth possible implementation manner, the obtaining, by the VIM, the information about the new-version VNF from the new service load forwarding point includes calling, by the VIM, an ExportVAPPInfoFromVLB interface to obtain the information about the new-version VNF from the new service load forwarding point; and the configuring, by the VIM and in the earlier service load forwarding point, the information about the new-version VNF includes calling, by the VIM, an ImportVAPPInfo-ToVLB interface to configure, in the earlier service load forwarding point, the information about the new-version VNF.

According to a second aspect, a service forwarding method is provided, applied in a network functions virtualization NFV system, where the method includes determining, by a service load forwarding point, a connection status of a received service request according to a stored connection record; and sending, by the service load forwarding point, the service request to an earlier-version VNF when the service request has a stateful connection; or sending, by the service load forwarding point, the service request to a new-version VNF when the service request has a stateless connection.

According to a third aspect, an NFV system is provided, including a VIM and an NFVO, where the VIM is configured to create a network resource according to an upgrade plan for an NFV application; the VIM is further configured to create a virtual machine for a new-version VNF according to the upgrade plan, configure the virtual machine on a test network according to the network resource, and perform upgrade configuration on the virtual machine according to an upgrade configuration script to obtain the new-version VNF; and the NFVO is configured to switch an earlier-version VNF to the new-version VNF after determining that a function test of the new-version VNF on the test network is successful; wherein the VIM is configured to create the virtual machine for the new-version VNF according to an instruction of the VNFM.

With reference to the third aspect, in a first possible implementation manner of the third aspect, the NFVO is further configured to, before the VIM creates the virtual machine for the new-version VNF according to the upgrade plan, instruct a virtualized network function manager VNFM to call a createVNF interface to create the new-version VNF, where an input parameter of the createVNF interface includes at least a version number of the new-version VNF.

With reference to the third aspect or the first possible implementation manner of the third aspect, in a second possible implementation manner of the third aspect, the system further includes an earlier service load forwarding point configured to manage traffic forwarding and load balancing of the earlier-version VNF; and the NFVO is configured to instruct the VIM to switch a network configuration of the new-version VNF, from the test network to a production network on which the earlier-version VNF is located; instruct the VIM to switch a database corresponding to the earlier-version VNF to a database corresponding to the new-version VNF; instruct the VIM to configure, in the earlier service load forwarding point corresponding to the earlier-version VNF, information about the new-version VNF, so that the earlier service load forwarding point manages traffic forwarding and load balancing of both the new-version VNF and the earlier-version VNF; and instruct the VIM to switch a service of the earlier-version VNF to the new-version VNF.

With reference to the second possible implementation manner of the third aspect, in a third possible implementation manner of the third aspect, the NFVO is configured to instruct the VIM to call an AddNewVAPPToVLB interface to configure, in the earlier service load forwarding point corresponding to the earlier-version VNF, the information about the new-version VNF.

With reference to the second or the third possible implementation manner of the third aspect, in a fourth possible implementation manner of the third aspect, the VIM is configured to, after the NFVO instructs the VIM to switch the database corresponding to the earlier-version VNF to the database corresponding to the new-version VNF, when a data model of the new-version VNF does not change relative to a data model of the earlier-version VNF, store data of the new-version VNF in the database corresponding to the earlier-version VNF; or when a data model of the new-version VNF changes relative to a data model of the earlier-version VNF, create a new database for the new-version VNF, and store data of the earlier-version VNF in the new database.

With reference to the second, the third, or the fourth possible implementation manner of the third aspect, in a fifth possible implementation manner of the third aspect, the VIM is further configured to instruct, according to the instruction delivered by the NFVO, the earlier service load forwarding point to determine a connection status of a service request according to a stored connection record when the earlier-version VNF is stateful; and the earlier service load forwarding point is configured to send the service request to the earlier-version VNF when determining that the service request has a stateful connection, or send the service request to the new-version VNF when determining that the service request has a stateless connection.

With reference to any one of the second to the fifth possible implementation manners of the third aspect, in a sixth possible implementation manner of the third aspect, the NFVO is configured to instruct the VIM to call a StartGracefulSwitchover interface to start a service switching procedure between the new-version VNF and the earlier-version VNF.

With reference to any one of the third aspect, or the first to the sixth possible implementation manners of the third aspect, in a seventh possible implementation manner of the third aspect, the VIM is further configured to create a new service load forwarding point according to the upgrade plan; and the VIM is further configured to configure, in the new service load forwarding point, the information about the new-version VNF, so that the new service load forwarding point manages traffic forwarding and load balancing of the new-version VNF.

With reference to the seventh possible implementation manner of the third aspect, in an eighth possible implementation manner of the third aspect, the VIM is configured to obtain the information about the new-version VNF from the new service load forwarding point; and configure, in the earlier service load forwarding point, the information about the new-version VNF, so that the earlier service load forwarding point manages the new-version VNF and the earlier-version VNF.

With reference to the eighth possible implementation manner of the third aspect, in a ninth possible implementation manner of the third aspect, the VIM is configured to call an ExportVAPPInfoFromVLB interface to obtain the new-version VNF from the new service load forwarding point; and call an ImportVAPPInfoToVLB interface to configure, in the earlier service load forwarding point, the information about the new-version VNF.

According to a fourth aspect, a service load forwarding point is provided, applied in a network functions virtualization NFV system and including a receiving module configured to receive a service request; a storage module configured to store a connection record; a determining module configured to determine, according to the connection record stored in the storage module, a connection status of the service request received by the receiving module; and a sending module configured to send the service request to an earlier-version virtualized network function VNF when the service request has a stateful connection, or send the service request to a new-version VNF when the service request has a stateless connection.

Based on the foregoing technical solutions, an automated upgrade procedure and upgrade steps for a network functions virtualization application are defined, so that upgrading the network functions virtualization application can be automated

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

The following first describes a network functions virtualization system in which a method for upgrading an NFV application provided in the embodiments of the present disclosure is applied.

Figure 1:
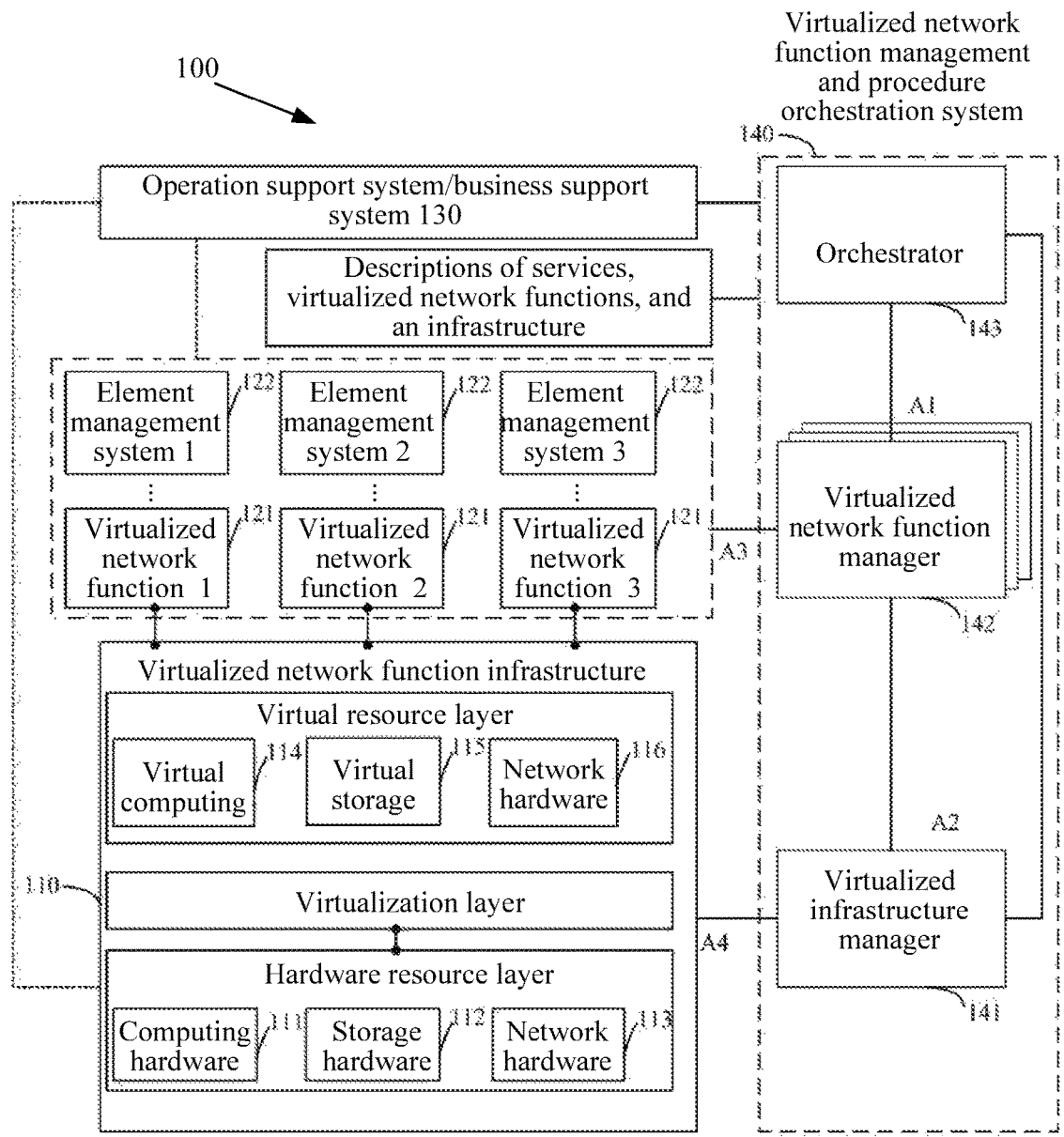
FIG. 1 is a schematic diagram of an architecture of an NFV system according to an embodiment of the present disclosure.

FIG. 1 is a schematic diagram of an architecture of an NFV system 100 according to an embodiment of the present disclosure. As shown in FIG. 1, a reference NFV architecture includes several main function components as follows.

An NFV infrastructure (NFVI) 110 provides virtual resources required to support execution of NFV, including commercial off the shelf (COTS) hardware, a necessary accelerator component, and a software layer used to virtualize and abstract underlying hardware.

VNF 121 are software implementation of network functions (NF) that can run on the NFVI. An element management system (EMS) 122 may be attached to a VNF 121 to understand and manage the individual VNF and a characteristic of the VNF. The VNF is equivalent to an entity of a network node and is expected to be delivered as only software independent of hardware.

VNF management and orchestration (M&O or MANO) system 140 includes life cycle management of a physical and/or software resource that orchestrates and supports infrastructure virtualization, and VNF life cycle management. The NFV M&O focuses on a management task specific to virtualization in the NFV framework. The NFV M&O also interacts with an operation support system (OSS)/business support system (BSS) 130 (outside the NFV), so as to allow the VNF 121 to be integrated into an existing network-wide management scenario.

The foregoing components interact with each other using defined reference points, so that different entities can be decoupled clearly, thereby facilitating forming of an open and innovative NFV ecosystem. A reference point between the VNF 121 and the NFVI 110 (or between internal entities of the NFVI 110) processes resource abstraction and virtualization, and hosting of the VNF 121, so that the VNF 121 can move from one server to another server in the NFVI 110, and selection of different underlying hardware is made possible. A reference point between the NFV M&O 140 and the VNF 121, or between the NFV M&O 140 and the NFVI 110 (or between internal entities of the NFV M&O) processes management and operation of the NFV system. A design manner of related components is allowed to reuse an existing solution (for example, a cloud management system), and the components also interact with an existing OSS/BSS environment to which the NFV system needs to be connected.

The following function components are further defined within the NFV M&O.

An NFVO 143 is mainly responsible for NS life cycle management, to implement a network service orchestration function; and orchestrates NFVI resources across multiple VIMs, to implement a resource orchestration function.

A VNFM 142 is responsible for VNF instance life cycle management. It is assumed that each VNF has one associated VNFM. One VNFM may be designated to manage a single VNF instance or manage multiple VNF instances of a same type or difference types. Available capabilities of the VNF manager include VNF instantiation, configuration of NFVI resources for a VNF, updating of a VNF instance, scaling of a VNF instance, collection of NFVI performance measurements and events related to a VNF instance, association of events related to a VNF instance, assisted or self healing of a VNF instance, termination of a VNF instance, integrity management throughout a life cycle of a VNF instance, global coordination and adaptation of configuration and event reporting between the NFVI and an EMS, and the like.

A VIM 141 is responsible for control and management of computing, storage, and network resources of the NFVI 110, and is generally in an infrastructure subdomain of one operator. One VIM 141 may specially process a specific type of NFVI resource or may manage multiple types of NFVI resources. Available capabilities of the VIM 141 include orchestrating allocation/upgrade/deallocation/reclamation of NFVI resources, managing association between virtual resources and computing, storage, and network resources, managing directories of hardware resources (computing, storage, and network resources) and software resources (for example, a management program), collecting and forwarding performance measurements and events of virtual resources, and the like.

Based on the foregoing architecture, multiple NFs may be used to implement an NS of a specific function. An end-to-end NS implemented on a conventional network is completely constituted by physical network functions (PNF). For an end-to-end NS implemented in NFV, generally, PNFs are still provided at the two ends, while all or some NFs in between are replaced by VNFs. A function and an external interface of each NF are not dependent on whether the NF is a PNF or a VNF. A topological relationship formed by links between the VNFs and the PNFs may be described using a VNF forwarding graph (VNFFG), and a characteristic of each NF is described by a corresponding network function descriptor (NFD).

The VNF needs to be implemented based on virtual resources (including virtual computing 114, virtual storage 115, and network resources 116) provided by the NFVI. These virtual resources are obtained by means of virtualization of corresponding physical resources, including computing hardware 111, storage hardware 112, and network hardware 113. The PNF is implemented directly based on physical resources. Unlike a conventional network on which all control is focused on a network device with integrated software and hardware, NFV is characterized by virtualization to implement decoupling between software and hardware of a network device, so that service control is performed by PNFs and VNFs, and performance control is performed by the NFVI, especially hardware resources of the NFVI.

In this embodiment of the present disclosure, to implement an automated deployment procedure for upgrading an NFV application, interfaces that are used during an upgrade process of the NFV application and that are of components in the NFV system 100 shown in FIG. 1 are defined. Then, the NFVO calls these interfaces during the application upgrade process, so as to implement an automated procedure for the application upgrade.

A1: VNFM interfaces provide a capability of VNF management, including VNF deployment and configuration. The following table lists some VNFM interfaces and parameters for implementing specific functions.

| Name | Parameter | Description |
|---|---|---|
| createVNF | VNF version: a version number of a VNF Template ID: an image ID VCPU, MEM, and DISK: a specification configuration Return value: VNF ID | Creates a VNF, including a version number of the VNF, an image, and specification information |
| deleteVNF | VNF ID | Deletes a specified VNF |

A2: VIM interfaces are interfaces for creating and operating resources provided by a cloud platform, including mainly creating a virtual machine, network configuration, and executing a script interface. In addition, the VIM interfaces may further include a special configuration interface for a VLB, to increase a VLB function of managing VNFs of different versions. The following table lists some VIM interfaces and parameters for implementing specific functions.

| Name | Parameter | Description |
|---|---|---|
| AddNewVAPPToVLB | Version: a version number of a VNF | Adds a new application |

| Name | Parameter | Description |
| --- | --- | --- |
| | VNF[ ]: an information list of a new-version VNF, including information required for connecting a VLB to the VNF, such as an IP address and a name | cluster to the load balancer |
| StartGracefulSwitchover | CallbackUrl: a callback interface for sending completion information when switching is completed | Starts a graceful switching procedure |
| ExportVAPPInfoFromVLB | Return value: VNF[ ]: a VNF information list | Obtains a VNF information list managed by the VLB |
| ImportVAPPInfoToVLB | VNF[ ]: a VNF information list Version: VNF version information | Imports VNF cluster information to the VLB |

A3: An interface for managing a VNF by an EMS element management system includes a configuration management interface for the VNF.

A4: An interface for interaction between the VIM and a virtual machine, for example, configuring a virtual machine (VM), starting the virtual machine, and installing software.

It should be understood that, the foregoing definitions of the component interfaces in A1 to A4 are intended to help a person skilled in the art better understand the embodiments of the present disclosure, but are not intended to limit the scope of the embodiments of the present disclosure. Obviously, a person skilled in the art can make various equivalent modifications or variations according to the foregoing examples in A1 to A4, and such modifications and variations shall also fall within the scope of the embodiments of the present disclosure.

Figure 2:
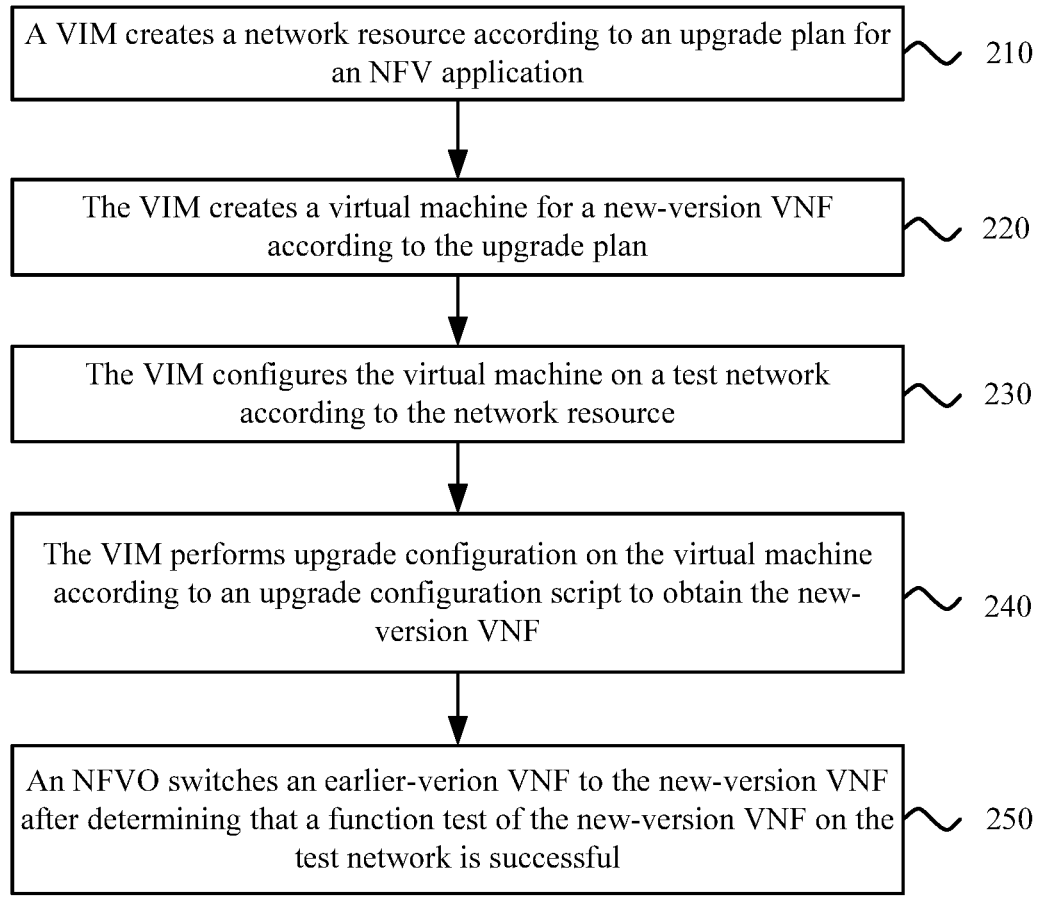
FIG. 2 is a schematic flowchart of a method for upgrading an NFV application according to an embodiment of the present disclosure.

FIG. 2 is a schematic flowchart of a method 100 for upgrading a network functions virtualization NFV application according to an embodiment of the present disclosure. The method shown in FIG. 2 is applicable to the NFV system 100. As shown in FIG. 2, the method 200 includes the following steps.

210. A VIM creates a network resource according to an upgrade plan for the NFV application.

The VIM may receive instruction information, delivered by an NFVO according to the upgrade plan for the NFV application, for creating a network resource, and then the VIM creates the network resource according to the instruction information. More specifically, after starting execution of the upgrade plan, the NFVO may call, according to the upgrade plan for the NFV application, a VNFM to create the network resource related to system upgrade. Further, the VNFM instructs the VIM to create the network resource. It should be understood that, the VIM may further create, according to the upgrade plan for the NFV application, a service load forwarding point for forwarding traffic of a new-version VNF.

The upgrade plan for the NFV application may include a component that needs to be upgraded, upgrade steps, an exception handling procedure, and a resource required for the upgrade, for example, a configuration script and an image of the new-version VNF. The network resource may be a virtual private cloud (VPC).

220. The VIM creates a virtual machine for a new-version VNF according to the upgrade plan.

The VIM creates the virtual machine for the new-version VNF according to the image, indicated by the upgrade plan, of the new-version virtualized network function VNF.

230. The VIM configures the virtual machine on a test network according to the network resource.

For example, an internet protocol (IP) address, a virtual local area network (VLAN), and the like of the virtual machine are configured for the new-version VNF. In this way, impact on an earlier-version VNF on a production network can be avoided.

240. The VIM performs upgrade configuration on the virtual machine according to an upgrade configuration script to obtain the new-version VNF.

Steps 220 to 240 are a process of creating the new-version VNF. The NFVO may instruct the VNFM to create the new-version VNF according to the upgrade plan for the NFV application. The VNFM obtains, from an image repository according to the instruction delivered by the NFVO, the image of the new-version VNF for upgrading the NFV application, and instructs the VIM to create the virtual machine for the new-version VNF according to the application image. Next, the VNFM instructs the VIM to configure the virtual machine on the test network according to the network resource. Subsequently, the VNFM obtains the upgrade configuration script from a script library, and delivers the upgrade configuration script to the virtual machine for the new-version VNF using the VIM. The VIM performs the upgrade configuration on the virtual machine to enable the new-version VNF to start servicing, so as to complete creation of the new-version VNF.

The application upgrade may involve upgrading multiple VNFs. Therefore, the foregoing steps 230 to 240 are repeated according to upgrade objects defined in the upgrade plan, until all new-version VNFs are created and configured successfully. It should be noted that, deployment of multiple VNFs may be in consideration of a need for upgrading multiple types of VNFs, or a need for deploying a cluster of VNFs of a same type.

250. An NFVO switches an earlier-version VNF to the new-version VNF after determining that a function test of the new-version VNF on the test network is successful.

After the upgrade deployment of the new-version VNF is completed according to steps 210 to 240, the function test may be performed on the new-version VNF. If the test is successful, the new-version VNF may be switched from the test system to the production system.

It should be noted that, in this embodiment of the present disclosure, the operation steps 210 to 240 performed by the VIM may be instructed by a specific instruction that is initiated by the NFVO and delivered to the VIM using VNFM.

Therefore, according to the method for upgrading an NFV application provided in this embodiment of the present disclosure, an automated upgrade procedure and upgrade steps for a network functions virtualization application are defined, so that upgrading the network functions virtualization application can be automated.

It should be understood that, before upgrading the NFV application, resources need to be prepared, including preparation of an image and a script. An administrator uploads application images of the new version to the image repository, and defines metadata of these images, for example, an image name, and a version number corresponding to an application. In addition, upgrade configuration scripts that need to be executed during the upgrade process are uploaded to the script library, and these upgrade configuration scripts are used to configure an upgraded system. Subsequently, the administrator may define the upgrade plan, for example, defining a component that needs to be upgraded, specific upgrade steps, a resource (for example, a script and an image) required for the upgrade, or an exception handling procedure may be defined. The upgrade procedure may be defined flexibly, and different upgrade processes are corresponding to different upgrade plans. After the foregoing preparation is completed, the NFVO executes the upgrade plan. The exception procedure is called to handle an error that occurs during execution of the upgrade plan. In case of failure of some critical tasks, the upgrade process is terminated and a rollback process is executed, and requested resources are recycled.

Optionally, in another embodiment of the present disclosure, before step 220, the method 200 may further include instructing, by the NFVO according to the upgrade plan, the VNFM to call a createVNF interface to create the new-version VNF, where an input parameter of the createVNF interface includes at least a version number of the new-version VNF. It should be understood that, the input parameter of the createVNF interface may further include an image identification (ID) of the new-version VNF, and specification information such as a virtual central processing unit (VCPU), a memory (MEM), and a disk. Correspondingly, in step 220, the VIM creates the virtual machine for the new-version VNF according to the instruction of the VNFM.

It should be noted that, a process of creating the new-version VNF may include content in steps 220 to 240. That is, the NFVO may deliver the instruction for creating the new-version VNF to the VNFM. The VNFM instructs, according to the instruction delivered by the NFVO, the VIM to create the virtual machine for the new-version VNF, and configures the virtual machine correspondingly.

Optionally, in another embodiment of the present disclosure, after step 250, the method 200 may further include creating, by the VIM, a new service load forwarding point according to the upgrade plan; and configuring, by the VIM and in the new service load forwarding point, information about the new-version VNF, so that the new service load forwarding point manages traffic forwarding and load balancing of the new-version VNF. The service load forwarding point may be a virtual load balancer (VLB), or may be another load procedure forwarding unit. For ease of description, the following uses a VLB as an example for description.

Figure 3:
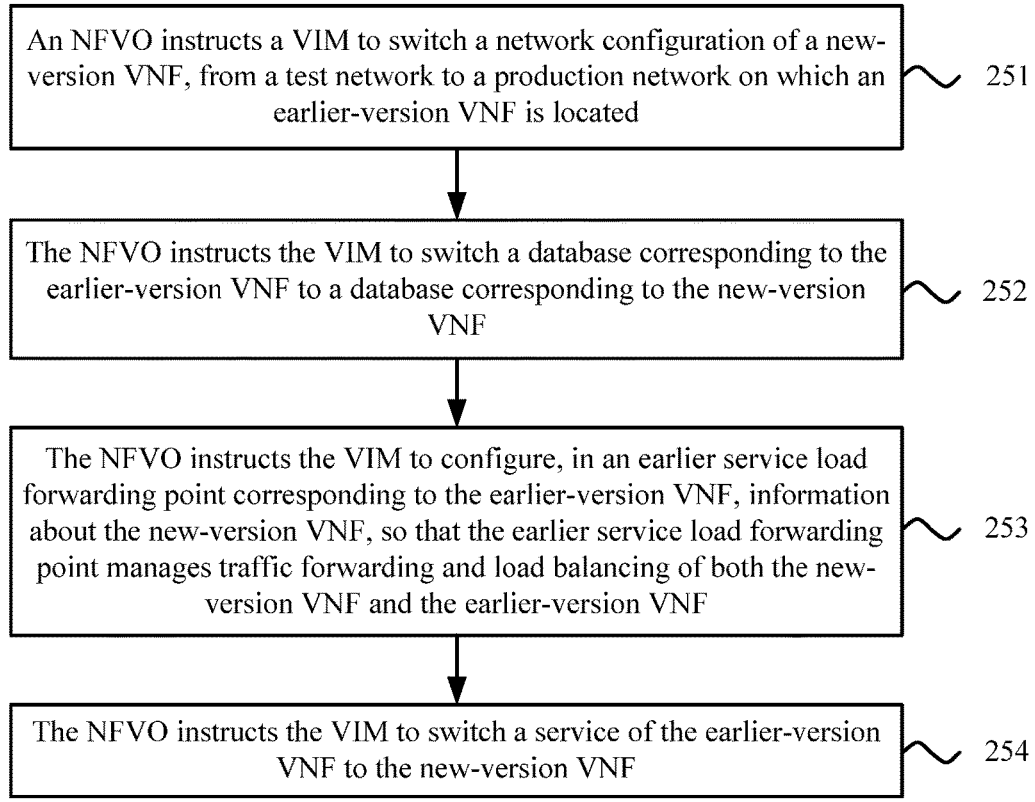
FIG. 3 is a schematic flowchart of a method for upgrading an NFV application according to another embodiment of the present disclosure.

In another embodiment of the present disclosure, as shown in FIG. 3, step 250 may include the following content.

251. The NFVO instructs the VIM to switch a network configuration of the new-version VNF, from the test network to a production network on which the earlier-version VNF is located.

Network switching needs to be first performed during version upgrade. At a deployment stage of the new version, a network of the new-version VNF is configured to be the test network that is completely separate from the production network, which facilitates a verification test without affecting a production environment. For switching to a production state, switching to the production network is required. During the switching process, an IP address, a VLAN, and the like are set for the new-version VNF according to network planning, to enable interconnection with the VLB on the production network.

252. The NFVO instructs the VIM to switch a database corresponding to the earlier-version VNF to a database corresponding to the new-version VNF.

Figure 4A:
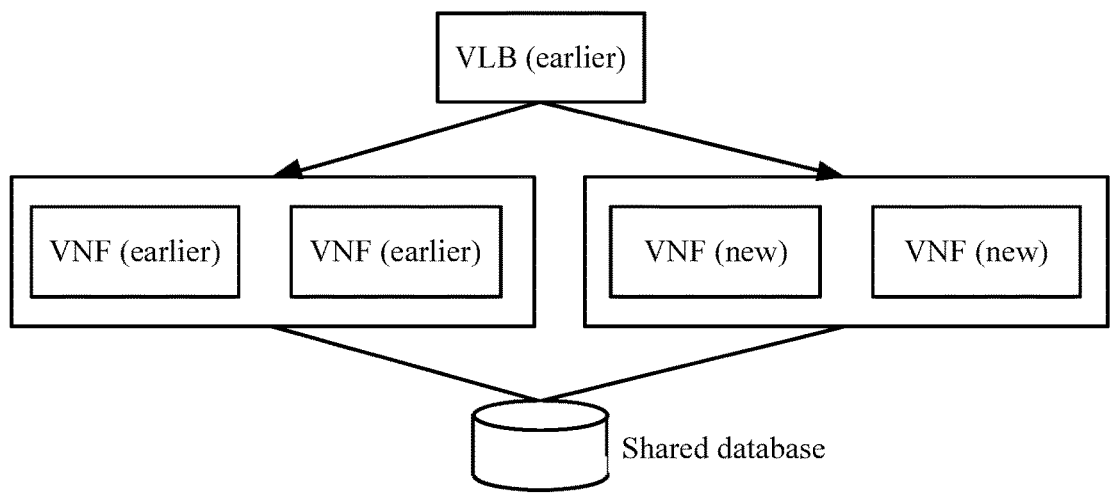
FIG. 4A and FIG. 4B are schematic block diagrams of database switching processes between a new-version VNF and an earlier-version VNF according to an embodiment of the present disclosure.
Figure 4B:
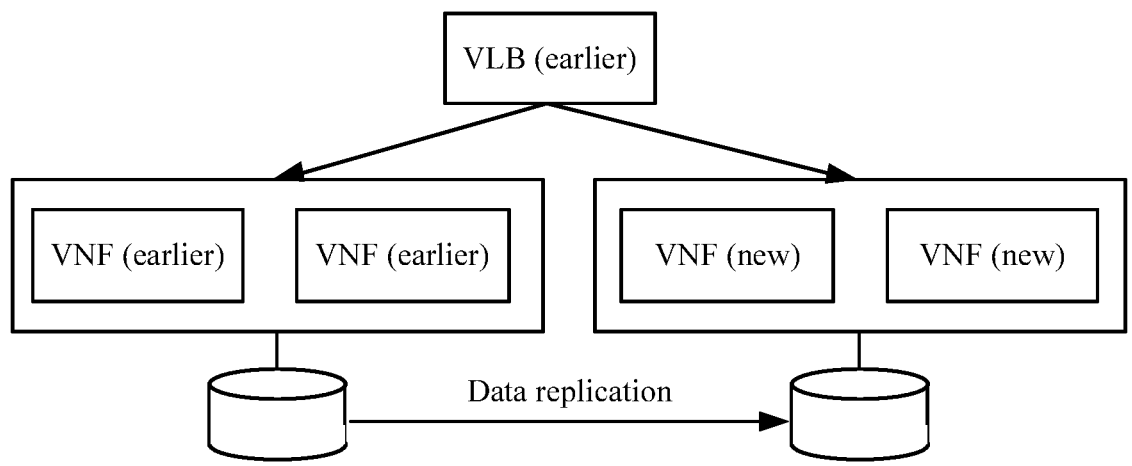

In another embodiment of the present disclosure, after step 252, the method 200 may further include, when a data model of the new-version VNF does not change relative to a data model of the earlier-version VNF, storing, by the VIM, data of the new-version VNF in the database corresponding to the earlier-version VNF. In this case, a new production database does not need to be created, and the data of the new-version VNF only needs to be stored in the earlier production database corresponding to the earlier-version VNF. The new-version VNF and the earlier-version VNF share the earlier production database, as shown in FIG. 4A. Alternatively, after step 252, the method 200 may further include, when a data model of the new-version VNF changes relative to a data model of the earlier-version VNF, creating, by the VIM, a new database, and replicating data of the earlier-version VNF in the new database. In this case, because the data model of the new-version VNF has changed, a new production database needs to be created for replicating the data of the earlier-version VNF to the new production database, as shown in FIG. 4B.

253. The NFVO instructs the VIM to configure, in an earlier service load forwarding point corresponding to the earlier-version VNF, information about the new-version VNF, so that the earlier service load forwarding point manages traffic forwarding and load balancing of both the new-version VNF and the earlier-version VNF.

Optionally, after step 253, the method 200 may further include obtaining, by the VIM, the information about the new-version VNF from the new service load forwarding point; and configuring, by the VIM and in the earlier service load forwarding point, the information about the new-version VNF, so that the earlier service load forwarding point manages both the new-version VNF and the earlier-version VNF.

In this embodiment of the present disclosure, the obtaining, by the VIM, the information about the new-version VNF from the new service load forwarding point includes calling, by the VIM, an ExportVAPPInfoFromVLB interface to obtain the information about the new-version VNF from the new service load forwarding point. The configuring, by the VIM and in the earlier service load forwarding point, the information about the new-version VNF includes calling, by the VIM, an ImportVAPPInfoToVLB interface to configure, in the earlier service load forwarding point, the information about the new-version VNF.

254. The NFVO instructs the VIM to switch a service of the earlier-version VNF to the new-version VNF.

In another embodiment of the present disclosure, in step 254, the NFVO instructs the VIM to call a StartGracefulSwitchover interface to start a service switching procedure between the new-version VNF and the earlier-version VNF.

In another embodiment of the present disclosure, after step 254, the method 200 may further include instructing, by the VIM according to the instruction delivered by the NFVO, the earlier service load forwarding point to determine a connection status of a service request according to a stored connection record when the earlier-version VNF is stateful; and sending, by the earlier service load forwarding point, the service request to the earlier-version VNF when determining that the service request has a stateful connection, so that the earlier-version VNF processes the service request; or sending, by the earlier service load forwarding point, the service request to the new-version VNF when determining that the service request has a stateless connection, so that the new-version VNF processes the service request. In this way, graceful service switching can be implemented during the upgrade process of the NFV application without interrupting a current service, and a current online user does not lose any state, which can improve user experience during the application upgrade process.

In step 250, the NFVO may instruct, using the NFVM, the VIM to perform steps 251 to 254.

After the graceful switching process is completed, all services are to be processed on a new VNF cluster, and the NFV application is upgraded successfully.

The upgrade process of the NFV application mainly includes two procedures: the application upgrade deployment procedure (corresponding to steps 210 to 240) and the graceful switching procedure (corresponding to step 250). The following describes in detail, with reference to FIG. 5 to FIG. 7, the application upgrade deployment procedure and the graceful service switching procedure in the method 200 for upgrading an NFV application provided in this embodiment of the present disclosure.

Figure 5:
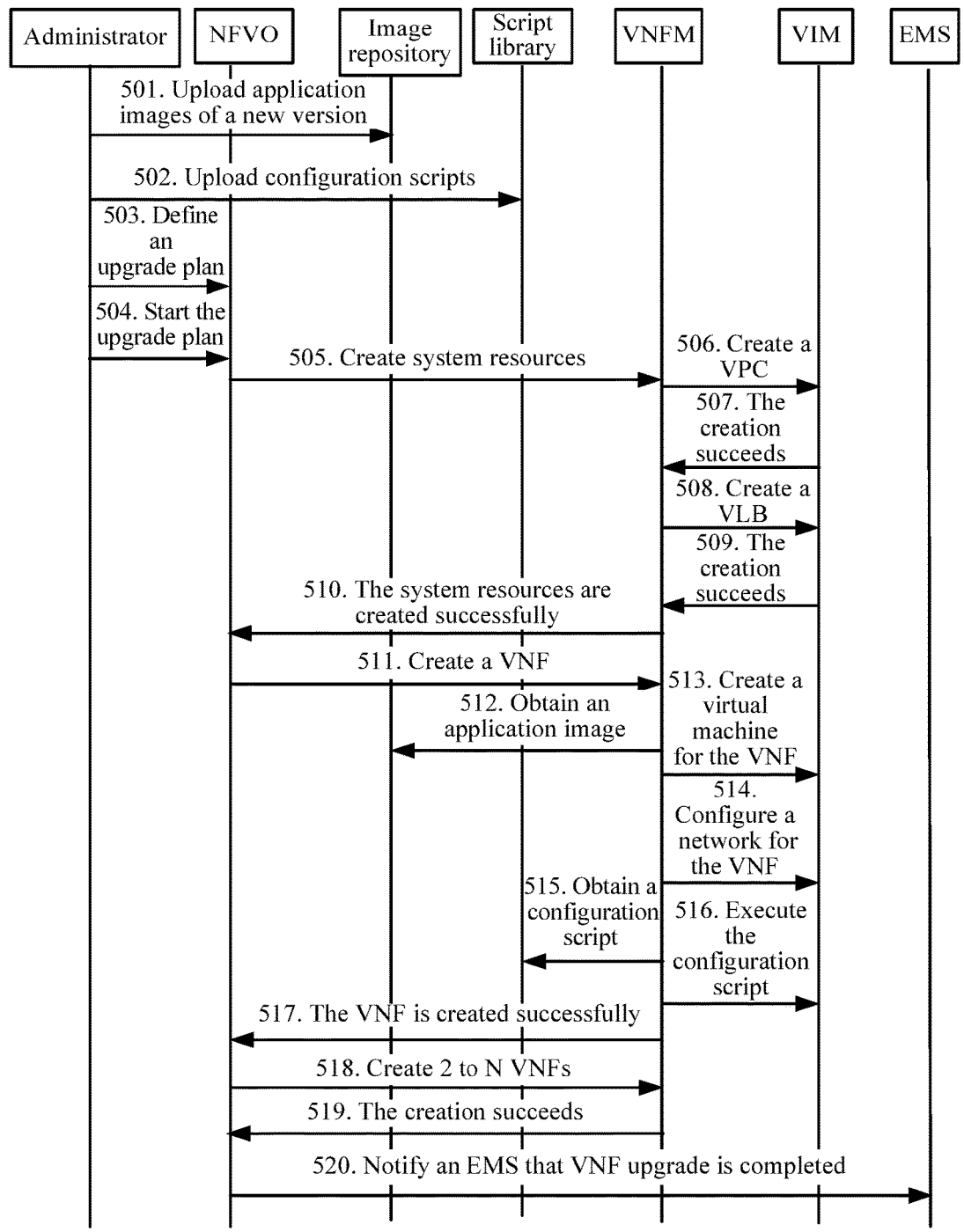
FIG. 5 is a schematic flowchart of an application upgrade deployment process in a method for upgrading an NFV application according to another embodiment of the present disclosure.

FIG. 5 is a schematic interaction diagram of an application upgrade deployment procedure in a method for upgrading an NFV application according to an embodiment of the present disclosure.

501-502. First prepare resources for the NFV application, including preparation of an image and a script. An administrator uploads application images of a new version to an image repository, and defines metadata of these images, for example, an image name, and a version number corresponding to an application. In addition, scripts that need to be executed during the upgrade process are uploaded to a script library, and these scripts are used to configure an upgraded system.

503. The administrator defines an upgrade plan. In the upgrade plan, a component that needs to be upgraded, specific upgrade steps, a resource (for example, a script and an image) required for the upgrade, an exception handling procedure, or the like may be defined. The upgrade procedure may be defined flexibly, and different upgrade processes are corresponding to different upgrade plans.

504. The administrator starts an NFVO to execute the upgrade plan, and the NFVO executes the defined upgrade plan according to the steps. The exception procedure is called to handle an error that occurs during execution of the upgrade plan. In case of failure of some critical tasks, the upgrade process is terminated and a rollback process is executed, and requested resources are recycled.

505-510. For the upgrade plan, system resources related to system upgrade need to be created first. The NFVO calls, using a VNFM, a VIM interface to create the system resources. The system resources include a network resource, and may further include a resource such as a VLB for forwarding traffic of a new-version VNF.

511-517. After completing creation of the system resources, the NFVO instructs the VNFM to call a createVNF interface to create the new-version VNF. Specific steps may include: 512. The VNFM obtains an application image from the image repository; 513. The VNFM instructs a VIM to use the application upgrade image to create a virtual machine for the new-version VNF; 514. The VNFM instructs the VIM to configure a network, such as an IP address and a VLAN, of the virtual machine for the new-version VNF. In the upgrade plan, the new VNF is configured on a test network, so that impact on a production VNF can be avoided; 515. The VNFM obtains an upgrade configuration script from the script library; and 516. The VNFM delivers the upgrade configuration script to the virtual machine for the new-version VNF using the VIM, and performs upgrade configuration on the virtual machine for the new-version VNF to enable the new-version VNF to start servicing. Now, the creation of the new-version VNF is completed.

Optionally, the application upgrade may involve upgrading multiple VNFs. Referring to steps 518 and 519, the foregoing steps 511 to 517 are repeated according to upgrade objects defined in the upgrade plan, until all VNFs that need to be upgraded are created and configured successfully. It should be noted that, deployment of multiple VNFs may be intended to meet a need for upgrading multiple types of VNFs, or a need for deploying a cluster of VNFs of a same type.

Now, configuration information of the new-version VNF may be transferred to the VLB. The configuration information includes information about a new-version VNF cluster corresponding to the VLB, such as a quantity of new-version VNFs and IP addresses of the new-version VNFs. With this step, the VLB completes configuration of an interface with the new-version VNF cluster. Therefore, the VLB may take over traffic forwarding and load balancing of the new-version VNF cluster. Adding a new VNF to the VLB may be implemented by the VIM by calling an AddNewVAPPToVLB interface. An input parameter of the AddNewVAPPToVLB interface may include a version number of the new-version VNF, and may further include an information list of the new-version VNF. The information list may include information required for connecting the VLB to the VNF, such as an IP address and a quantity of VNFs.

520. After completing creation and upgrade configuration of the VNF, the VNFM notifies a VNF management system EMS that the upgrade is completed.

Figure 6:
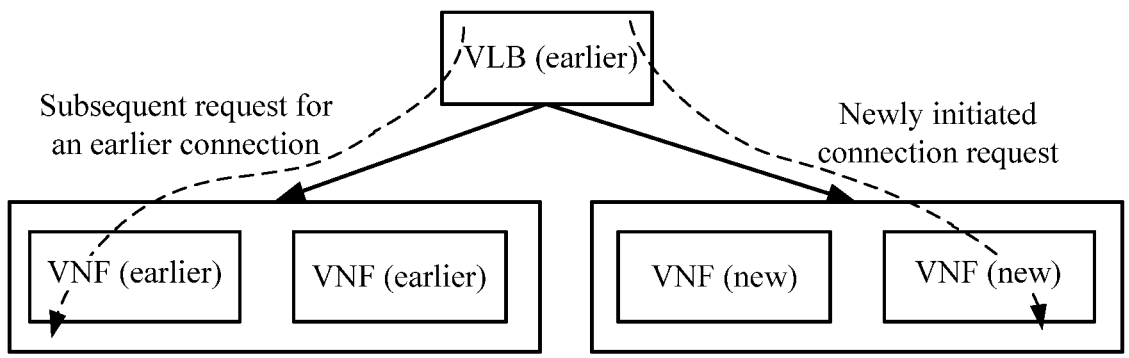
FIG. 6 is a schematic block diagram of a graceful service switching process in a method for upgrading an NFV application according to another embodiment of the present disclosure.
Figure 7:
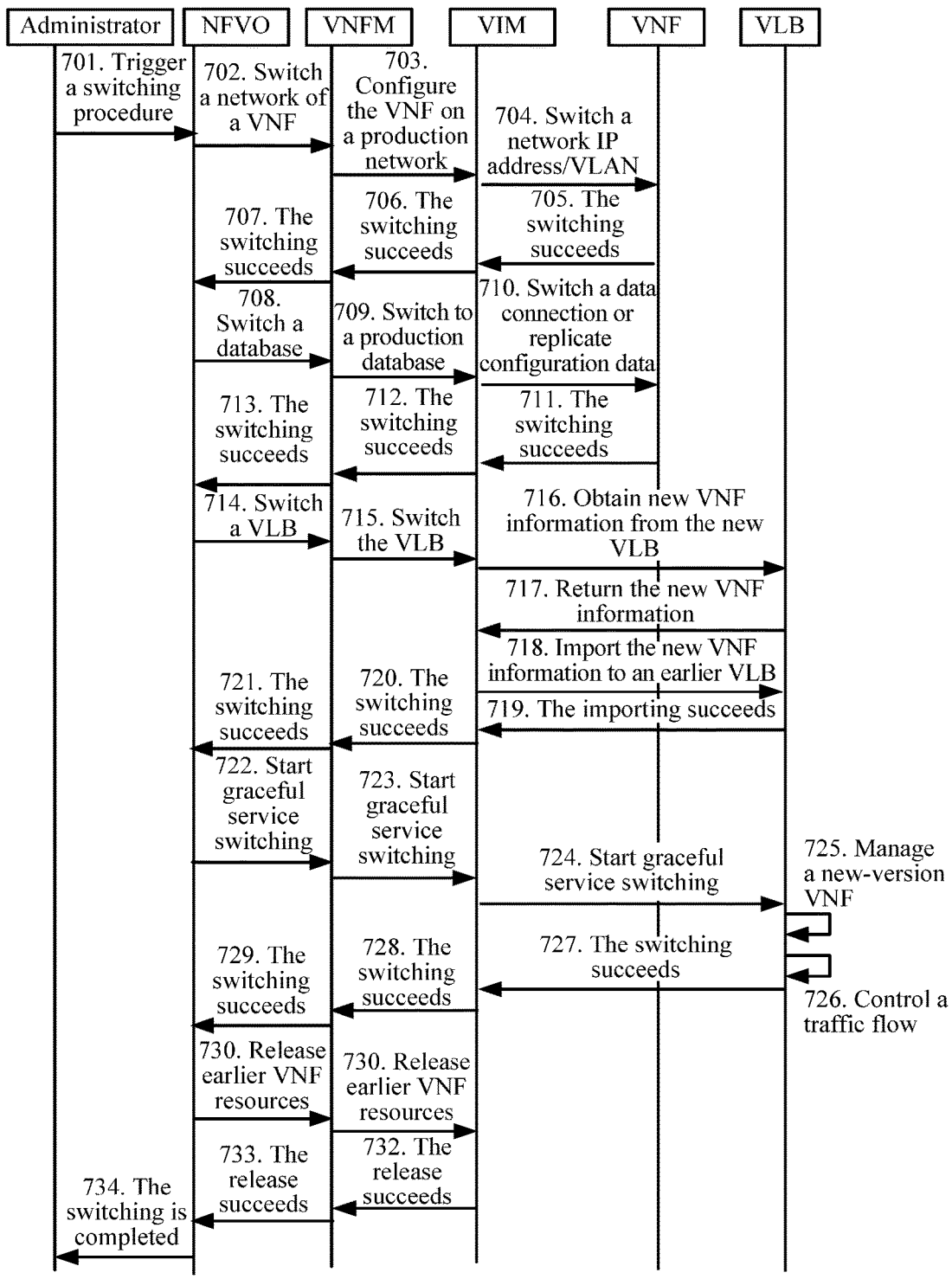
FIG. 7 is a schematic flowchart of an upgrade switching process in a method for upgrading an NFV application according to another embodiment of the present disclosure.

The following describes in detail, with reference to FIG. 6 and FIG. 7, a graceful switching process in the method for upgrading an NFV application provided in this embodiment of the present disclosure.

In this embodiment of the present disclosure, a VLB can record a current access connection, for example, using a connection record table. The VLB can determine, using the connection record table, whether a service request is a new service connection or an earlier service connection. As shown in FIG. 6, the VLB sends a new service connection to the new-version VNF for processing, and still sends an earlier service connection to the earlier-version VNF, so as to ensure state continuity. Therefore, according to the method for upgrading an NFV application provided in this embodiment of the present disclosure, graceful service switching can be implemented without affecting user experience of a current online user.

FIG. 7 is a schematic interaction diagram of a graceful switching procedure in a method for upgrading an NFV application according to an embodiment of the present disclosure.

701. After performing a function test on an upgraded VNF component, an administrator starts an upgrade switching procedure.

702-707. An NFVO instructs, using a VNFM, a VIM to perform network switching for a new-version VNF. At a deployment stage of the new version, a network of the VNF is configured to be a test network that is completely separate from a production network, which facilitates a verification test without affecting a production environment. For switching to a production state, switching to the production network is required. During the switching process, an IP address, a VLAN, and the like are set for the VNF according to network planning, so that the new-version VNF is interconnected with a VLB on the production network.

708-713. After completing the network switching, the NFVO instructs, using the VNFM, the VIM to perform database switching. For this process, refer to the database switching method shown in FIG. 4A and FIG. 4B. Details are not described herein again.

714-721. Next, the NFVO instructs, using the VNFM, the VIM to perform VLB switching, to use a new VLB of the new-version VNF or a new-version VNF cluster as a production VLB. In this case, the production VLB manages both an earlier VNF cluster and the new VNF cluster.

722-729. After completing the foregoing switching, the NFVO instructs, using the VNFM, the VIM to start a graceful service switching process of the VLB. After the process is completed, all services are to be processed on the new VNF cluster.

730-733. After completing the graceful switching, the NFVO starts a resource release process, to gradually release earlier-version virtual resources, so that graceful version upgrade of an earlier-version VNF in the production environment is completed.

734. Notify the administrator that the switching is completed. Now, upgrade of the NFV application is completed.

It should be understood that sequence numbers of the foregoing processes do not mean orders of execution in the embodiments of the present disclosure. The execution orders of the processes should be determined according to functions and internal logic of the processes, and should by no means limit the implementation processes of the embodiments of the present disclosure.

Therefore, according to the method for upgrading an NFV application provided in this embodiment of the present disclosure, an automated upgrade procedure and upgrade steps for a network functions virtualization application are defined, so that upgrading the network functions virtualization application can be automated.

Figure 8:
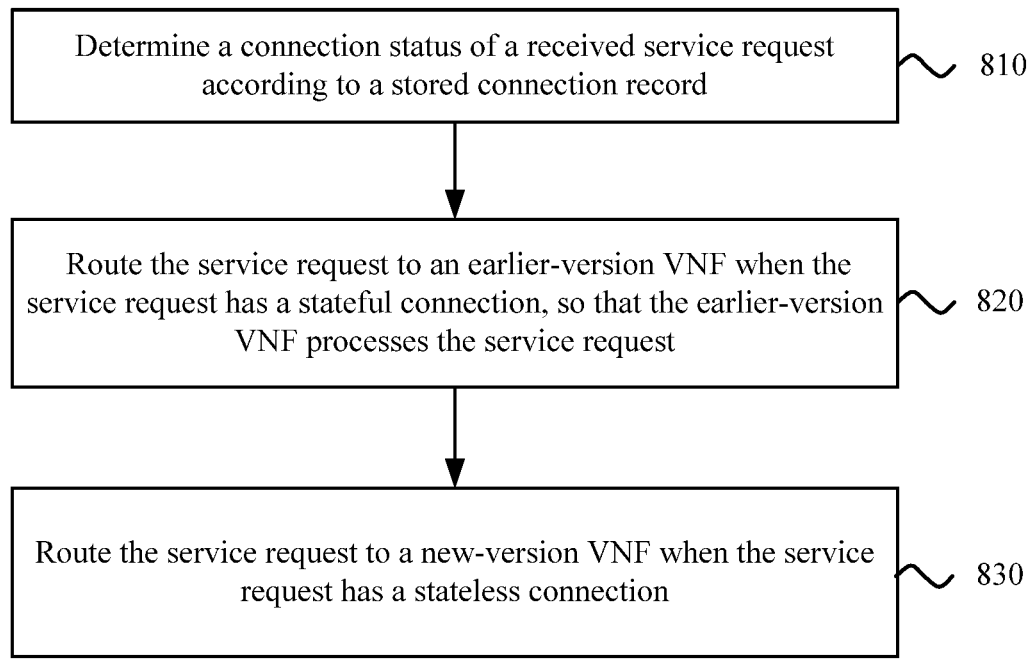
FIG. 8 is a schematic flowchart of service forwarding method according to an embodiment of the present disclosure.

FIG. 8 is a schematic flowchart of a service forwarding method 800 according to an embodiment of the present disclosure. The method 800 is applied in a network function virtualization NFV system, and may be executed by a service load forwarding point. As shown in FIG. 8, the method 800 may include the following content.

810. The service load forwarding point determines a connection status of a received service request according to a stored connection record.

For example, the service load forwarding point may store a connection record table, and may determine the connection status of the service request according to the connection record table. If a connection of the current service request is in the table, the service request is a service request that has an earlier connection; or if a connection of the current service request is not in the table, the service request is a service request that is newly initiated.

820. The service load forwarding point sends the service request to an earlier-version VNF when the service request has a stateful connection.

830. The service load forwarding point sends the service request to a new-version VNF when the service request has a stateless connection.

When the service request has a stateless connection, it means that the service request is a service request that is newly initiated.

It should be understood that, the service load forwarding point has a capability of managing load balancing of the new-version VNF and the earlier-version VNF, and can perform load balancing separately for the new-version VNF and the earlier-version VNF. In this way, graceful service switching can be implemented during an application upgrade process without interrupting a current service, and a current online user does not lose any state, which can improve user experience during the application upgrade process.

Therefore, according to the service forwarding method provided in this embodiment of the present disclosure, a connection status of a service request is determined according to a stored connection record, a service request that has a stateful connection is sent to an earlier-version VNF, and a service request that has a stateless connection is sent to a new-version VNF. In this way, load balancing of both the new-version VNF and the earlier-version VNF can be managed, so that graceful service switching can be implemented during an application upgrade process.

The foregoing describes in detail, with reference to FIG. 1 to FIG. 8, the method for upgrading an NFV application and the service forwarding method that are provided in the embodiments of the present disclosure. The following describes in detail, with reference to FIG. 9 to FIG. 11, an NFV system and a service load forwarding point that are provided in the embodiments of the present disclosure.

Figure 9:
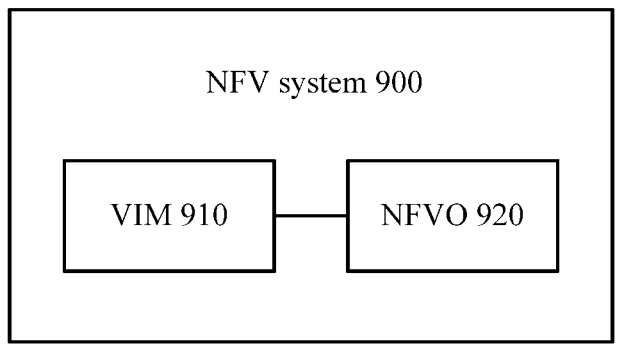
FIG. 9 is a schematic block diagram of an NFV system according to an embodiment of the present disclosure.

FIG. 9 is a schematic block diagram of a network functions virtualization NFV system 900 according to an embodiment of the present disclosure. As shown in FIG. 9, the NFV system 900 includes a VIM 910 and an NFVO 920.

The VIM 910 is configured to create a network resource according to an upgrade plan for an NFV application. The VIM 910 is further configured to create a virtual machine for a new-version VNF according to the upgrade plan, configure the virtual machine on a test network according to the network resource, and perform upgrade configuration on the virtual machine according to an upgrade configuration script to obtain the new-version VNF. The NFVO 920 is configured to switch an earlier-version VNF to the new-version VNF after determining that a function test of the new-version VNF on the test network is successful.

Therefore, according to the NFV system provided in this embodiment of the present disclosure, an automated upgrade procedure and upgrade steps for a network functions virtualization application are defined, so that upgrading the network functions virtualization application can be automated.

Figure 10:
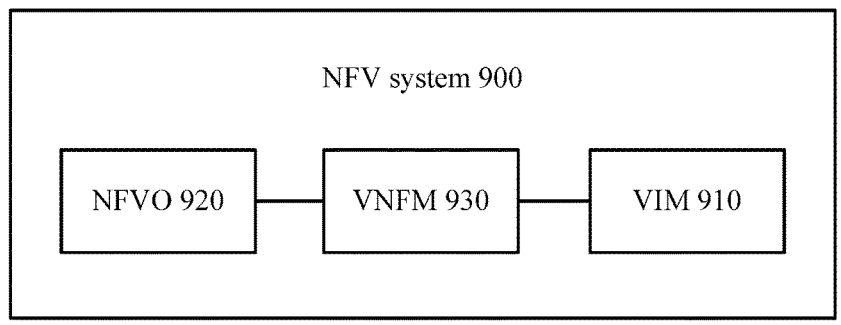
FIG. 10 is a schematic block diagram of an NFV system according to another embodiment of the present disclosure.

Optionally, in another embodiment of the present disclosure, as shown in FIG. 10, the NFV system 900 further includes a VNFM 930. The NFVO 920 may be further configured to, before the VIM 910 creates the virtual machine for the new-version VNF according to the upgrade plan, instruct, according to the upgrade plan, the VNFM 930 to call a createVNF interface to create the new-version VNF, where an input parameter of the createVNF interface includes at least a version number of the new-version VNF. Correspondingly, the VIM 910 is configured to create the virtual machine for the new-version VNF according to the instruction of the VNFM.

Figure 11:
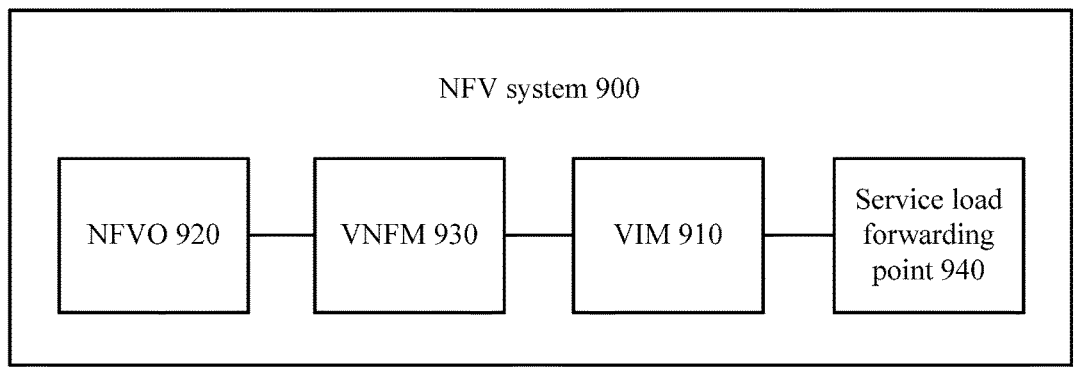
FIG. 11 is a schematic block diagram of an NFV system according to another embodiment of the present disclosure.

Optionally, as shown in FIG. 11, in another embodiment of the present disclosure, the NFV 900 further includes an earlier service load forwarding point 940 configured to manage traffic forwarding and load balancing of the earlier-version VNF. The NFVO 920 may be configured to instruct the VIM 910 to switch a network configuration of the new-version VNF, from the test network to a production network on which the earlier-version VNF is located; instruct the VIM 910 to switch a database corresponding to the earlier-version VNF to a database corresponding to the new-version VNF; instruct the VIM 910 to configure, in the earlier service load forwarding point corresponding to the earlier-version VNF, information about the new-version VNF, so that the earlier service load forwarding point manages traffic forwarding and load balancing of both the new-version VNF and the earlier-version VNF; and instruct the VIM 910 to switch a service of the earlier-version VNF to the new-version VNF.

Optionally, in another embodiment of the present disclosure, the NFVO 920 is configured to instruct the VIM to call an AddNewVAPPToVLB interface to configure, in the earlier service load forwarding point corresponding to the earlier-version VNF, the information about the new-version VNF.

In another embodiment of the present disclosure, the VIM 910 is configured to, after the NFVO instructs the VIM to switch the database corresponding to the earlier-version VNF to the database corresponding to the new-version VNF, when a data model of the new-version VNF does not change relative to a data model of the earlier-version VNF, store data of the new-version VNF in the database corresponding to the earlier-version VNF; or when a data model of the new-version VNF changes relative to a data model of the earlier-version VNF, create a new database for the new-version VNF, and store data of the earlier-version VNF in the new database.

In another embodiment of the present disclosure, the VIM 910 is further configured to instruct, according to the instruction delivered by the NFVO 920, the earlier service load forwarding point 940 to determine a connection status of a service request according to a stored connection record when the earlier-version VNF is stateful. The earlier service load forwarding point 940 is configured to send the service request to the earlier-version VNF when determining that the service request has a stateful connection, so that the earlier-version VNF processes the service request; or send the service request to the new-version VNF when determining that the service request has a stateless connection.

In another embodiment of the present disclosure, the NFVO 920 is configured to instruct the VIM to call a StartGracefulSwitchover interface to start a service switching procedure between the new-version VNF and the earlier-version VNF.

Optionally, in another embodiment of the present disclosure, the VIM 910 is further configured to create a new service load forwarding point according to the upgrade plan. The VIM 910 is further configured to configure, in the new service load forwarding point, the information about the new-version VNF, so that the new service load forwarding point manages traffic forwarding and load balancing of the new-version VNF.

In this embodiment of the present disclosure, the VIM 910 is configured to obtain the information about the new-version VNF from the new service load forwarding point; and configure, in the earlier service load forwarding point, the information about the new-version VNF, so that the earlier service load forwarding point manages the new-version VNF and the earlier-version VNF.

The VIM 910 is configured to call an ExportVAPPInfoFromVLB interface to obtain the information about the new-version VNF from the new service load forwarding point; and call an ImportVAPPInfoToVLB interface to configure, in the earlier service load forwarding point, the information about the new-version VNF.

It should be understood that, the NFV system 900 provided in this embodiment of the present disclosure may be corresponding to the NFV system in the method 200 for upgrading an NFV application provided in the embodiments of the present disclosure. In addition, operations and/or functions of the modules in the NFV system 900 are respectively for implementing corresponding procedures of the method 200 in FIG. 2 to FIG. 7. For brevity, details are not described herein again.

Therefore, according to the NFV system provided in this embodiment of the present disclosure, an automated upgrade procedure and upgrade steps for a network functions virtualization application are defined, so that upgrading the network functions virtualization application can be automated.

Figure 12:
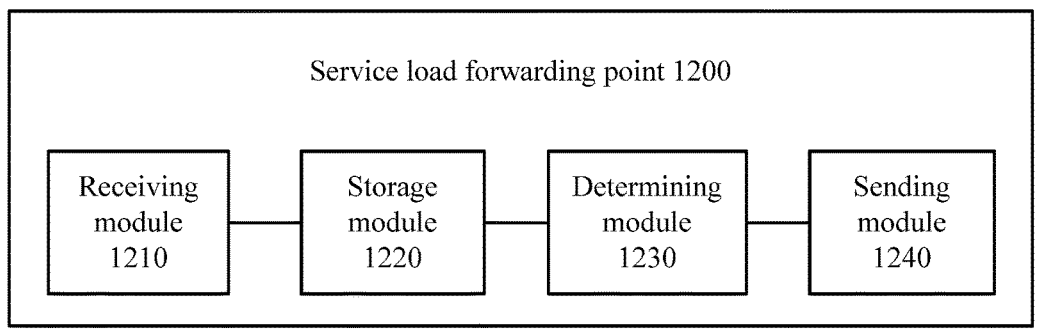
FIG. 12 is a schematic block diagram of a service load forwarding point according to an embodiment of the present disclosure.

FIG. 12 is a schematic block diagram of a service load forwarding point 1200 according to an embodiment of the present disclosure. As shown in FIG. 12, the service load forwarding point 1200 includes a receiving module 1210, a storage module 1220, a determining module 1230, and a sending module 1240.

The receiving module 1210 is configured to receive a service request. The storage module 1220 is configured to store a connection record. The determining module 1230 is configured to determine, according to the connection record stored in the storage module 1220, a connection status of the service request received by the receiving module 1210. The sending module 1240 is configured to send the service request to an earlier-version VNF when the service request has a stateful connection; or send the service request to a new-version VNF when the service request has a stateless connection.

It should be understood that, the service load forwarding point 1200 provided in this embodiment of the present disclosure may be corresponding to the service load forwarding point in the service forwarding method 800 (shown in FIG. 8) provided in the embodiments of the present disclosure. In addition, operations and/or functions of the modules in the service load forwarding point 1200 are respectively for implementing corresponding procedures of the method 800 in FIG. 8. For brevity, details are not described herein again.

Therefore, according to the service load forwarding point provided in this embodiment of the present disclosure, a connection status of a service request is determined according to a stored connection record, a service request that has a stateful connection is sent to an earlier-version VNF, and a service request that has a stateless connection is sent to a new-version VNF. In this way, load balancing of both the new-version VNF and the earlier-version VNF can be managed, so that graceful service switching can be implemented during an application upgrade process.

Figure 13:
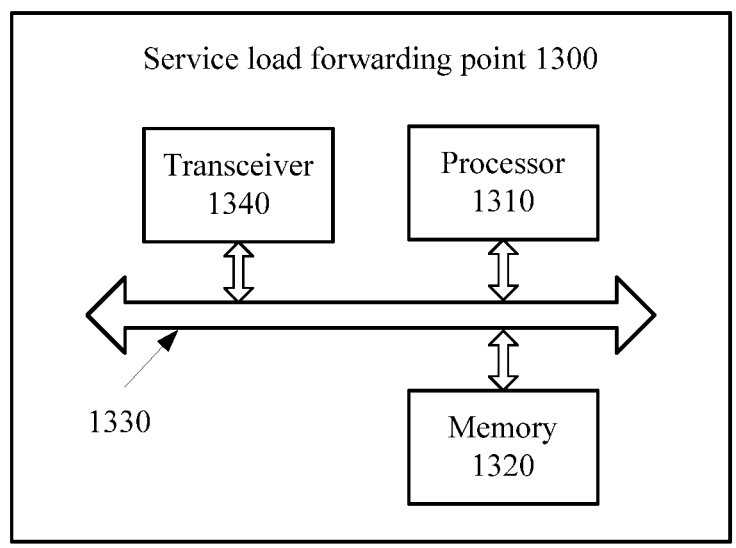
FIG. 13 is a schematic block diagram of a service load forwarding point according to another embodiment of the present disclosure.

FIG. 13 is a schematic block diagram of a service load forwarding point 1300 according to another embodiment of the present disclosure. As shown in FIG. 13, the service load forwarding point 1300 includes a processor 1310, a memory 1320, a bus system 1330, and a transceiver 1340. The processor 1310, the memory 1320, and the transceiver 1340 are connected using the bus system 1330, the memory 1320 is configured to store an instruction, and the processor 1310 is configured to execute the instruction stored in the memory 1320.

The transceiver 1340 is configured to receive a service request. The memory 1320 is further configured to store a connection record. The processor 1310 is configured to determine, according to the connection record stored in the memory 1320, a connection status of the service request received by the transceiver 1340. The transceiver 1340 is further configured to send the service request to an earlier-version VNF when the service request has a stateful connection, so that the earlier-version VNF processes the service request; or send the service request to a new-version VNF when the service request has a stateful connection, so that the new-version VNF processes the service request.

It should be understood that, the service load forwarding point 1300 provided in this embodiment of the present disclosure may be corresponding to the service load forwarding point in the service forwarding method 800 and the service load forwarding point 1200 that are provided in the embodiments of the present disclosure. In addition, operations and/or functions of the modules in the service load forwarding point 1300 are respectively for implementing corresponding procedures of the method 800 in FIG. 8. For brevity, details are not described herein again.

Therefore, according to the service load forwarding point provided in this embodiment of the present disclosure, a connection status of a service request is determined according to a stored connection record, a service request that has a stateful connection is sent to an earlier-version VNF, and a service request that has a stateless connection is sent to a new-version VNF. In this way, load balancing of both the new-version VNF and the earlier-version VNF can be managed, so that graceful service switching can be implemented during an application upgrade process.

A person of ordinary skill in the art may be aware that, units and algorithm steps described with reference to the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for upgrading a network functions virtualization (NFV) application, comprising:
    creating, by a virtualized infrastructure manager (VIM), a network resource according to an upgrade plan for the NFV application;
    creating, by the VIM, a virtual machine for a new-version virtualized network function (VNF) according to the upgrade plan;
    configuring, by the VIM, the virtual machine on a test network according to the network resource;
    performing, by the VIM, upgrade configuration on the virtual machine according to an upgrade configuration script to obtain the new-version VNF;
    switching, by an NFV orchestrator (NFVO), an earlier-version VNF to the new-version VNF after determining that a function test of the new-version VNF on the test network is successful;
wherein switching, by the NFVO, the earlier-version VNF to the new-version VNF comprises:
    instructing, by the NFVO, the VIM to switch a network configuration of the new-version VNF from the test network to a production network on which the earlier-version VNF is located;
    instructing, by the NFVO, the VIM to switch a database corresponding to the earlier-version VNF to a database corresponding to the new-version VNF;
    instructing, by the NFVO, the VIM to configure, in an earlier service load forwarding point corresponding to the earlier-version VNF, information about the new-version VNF, such that the earlier service load forwarding point manages traffic forwarding and load balancing of both the new-version VNF and the earlier-version VNF; and
    instructing, by the NFVO, the VIM to switch a service of the earlier-version VNF to the new-version VNF.

2. The method according to claim 1, wherein before creating, by the VIM, the virtual machine for the new-version VNF according to the upgrade plan, the method further comprises instructing, by the NFVO according to the upgrade plan, a virtualized network function manager (VNFM) to call a create VNF interface to create the new-version VNF, wherein an input parameter of the create VNF interface comprises at least a version number of the new-version VNF, and wherein creating, by the VIM, the virtual machine for the new-version VNF according to the upgrade plan comprises creating, by the VIM, the virtual machine for the new-version VNF according to the instruction of the VNFM.

3. The method according to claim 1, wherein instructing, by the NFVO, the VIM to configure, in the earlier service load forwarding point corresponding to the earlier-version VNF, the information about the new-version VNF comprises instructing, by the NFVO, the VIM to call an AddNewVAPPToVLB interface to configure, in the earlier service load forwarding point corresponding to the earlier-version VNF, the information about the new-version VNF.

4. The method according to claim 1, wherein after instructing, by the NFVO, the VIM to switch the database corresponding to the earlier-version VNF to the database corresponding to the new-version VNF, the method further comprises:
storing, by the VIM, data of the new-version VNF in the database corresponding to the earlier-version VNF when a data model of the new-version VNF does not change relative to a data model of the earlier-version VNF; and
creating, by the VIM, a new database for the new-version VNF, and storing data of the earlier-version VNF in the new database when a data model of the new-version VNF changes relative to a data model of the earlier-version VNF.

5. The method according to claim 1, wherein after instructing, by the NFVO, the VIM to switch the service of the earlier-version VNF to the new-version VNF, the method further comprises:
instructing, by the VIM according to the instruction delivered by the NFVO, the earlier service load forwarding point to determine a connection status of a service request according to a stored connection record when the earlier-version VNF is stateful; sending, by the earlier service load forwarding point, the service request to the earlier-version VNF when determining that the service request has a stateful connection; and sending, by the earlier service load forwarding point, the service request to the new-version VNF when determining that the service request has a stateless connection.

6. The method according to claim 1, wherein instructing, by the NFVO, the VIM to switch the service of the earlier-version VNF to the new-version VNF comprises instructing, by the NFVO, the VIM to call a StartGracefulSwitchover interface to start a service switching procedure between the new-version VNF and the earlier-version VNF.

7. The method according to claim 1, wherein before switching, by the NFVO, the earlier-version VNF to the new-version VNF, the method further comprises:
creating, by the VIM, a new service load forwarding point according to the upgrade plan; and
configuring, by the VIM and in the new service load forwarding point, information about the new-version VNF, such that the new service load forwarding point manages traffic forwarding and load balancing of the new-version VNF.

8. The method according to claim 7, wherein after instructing the VIM to configure, in an earlier service load forwarding point corresponding to the earlier-version VNF, the information about the new-version VNF, the method further comprises:

obtaining, by the VIM, the information about the new-version VNF from the new service load forwarding point; and
configuring, by the VIM and in the earlier service load forwarding point, the information about the new-version VNF, such that the earlier service load forwarding point manages the new-version VNF and the earlier-version VNF.

9. The method according to claim 8, wherein obtaining, by the VIM, the information about the new-version VNF from the new service load forwarding point comprises calling, by the VIM, an ExportVAPPInfoFromVLB interface to obtain the information about the new-version VNF from the new service load forwarding point, and wherein configuring, by the VIM and in the earlier service load forwarding point, the information about the new-version VNF comprises calling, by the VIM, an ImportVAPPInfoToVLB interface to configure, in the earlier service load forwarding point, the information about the new-version VNF.

10. A network functions virtualization (NFV) system, comprising:
a memory that includes computer instructions;
a processor coupled to retrieve and execute the computer instructions that prompt the processor generate:
an NFV orchestrator (NFVO); and
a virtualized infrastructure manager (VIM) configured to:
create a network resource according to an upgrade plan for an NFV application;
create a virtual machine for a new-version virtualized network function (VNF) according to the upgrade plan;
configure the virtual machine on a test network according to the network resource; and
perform upgrade configuration on the virtual machine according to an upgrade configuration script to obtain the new-version VNF,
wherein the NFVO is configured to switch an earlier-version VNF to the new-version VNF after determining that a function test of the new-version VNF on the test network is successful;
wherein the NFV system further comprising:
an earlier service load forwarding point configured to manage traffic forwarding and load balancing of the earlier-version VNF,
wherein the NFVO is further configured to:
instruct the VIM to switch a network configuration of the new-version VNF, from the test network to a production network on which the earlier-version VNF is located;
instruct the VIM to switch a database corresponding to the earlier-version VNF to a database corresponding to the new-version VNF;
instruct the VIM to configure, in the earlier service load forwarding point corresponding to the earlier-version VNF, information about the new-version VNF, such that the earlier service load forwarding point manages traffic forwarding and load balancing of both the new-version VNF and the earlier-version VNF; and
instruct the VIM to switch a service of the earlier-version VNF to the new-version VNF.

11. The system according to claim 10, wherein the NFVO is further configured to instruct a virtualized network function manager (VNFM) to call a create VNF interface to create the new-version VNF before the VIM creates the virtual machine for the new-version VNF according to the upgrade plan, wherein an input parameter of the create VNF interface comprises at least a version number of the new-version VNF, and wherein the VIM is further configured to create the virtual machine for the new-version VNF according to the instruction of the VNFM.

12. The system according to claim 10, wherein the NFVO is further configured to instruct the VIM to call an AddNewVAPPToVLB interface to configure, in the earlier service load forwarding point corresponding to the earlier-version VNF, the information about the new-version VNF.

13. The system according to claim 10, wherein after the NFVO instructs the VIM to switch the database corresponding to the earlier-version VNF to the database corresponding to the new-version VNF, the VIM is further configured to:
store data of the new-version VNF in the database corresponding to the earlier-version VNF when a data model of the new-version VNF does not change relative to a data model of the earlier-version VNF; and
create a new database for the new-version VNF, and store data of the earlier-version VNF in the new database when a data model of the new-version VNF changes relative to a data model of the earlier-version VNF.

14. The system according to claim 10, wherein the VIM is further configured to instruct, according to the instruction delivered by the NFVO, the earlier service load forwarding point to determine a connection status of a service request according to a stored connection record when the earlier-version VNF is stateful, and wherein the earlier service load forwarding point is further configured to:
send the service request to the earlier-version VNF when determining that the service request has a stateful connection; or
send the service request to the new-version VNF when determining that the service request has a stateless connection.

15. The system according to claim 10, wherein the NFVO is further configured to instruct the VIM to call a Start-GracefulSwitchover interface to start a service switching procedure between the new-version VNF and the earlier-version VNF.

16. The system according to claim 10, wherein the VIM is further configured to:
create a new service load forwarding point according to the upgrade plan; and
configure, in the new service load forwarding point, information about the new-version VNF, such that the new service load forwarding point manages traffic forwarding and load balancing of the new-version VNF.

17. The system according to claim 16, wherein the VIM is further configured to:
obtain the information about the new-version VNF from the new service load forwarding point; and
configure, in an earlier service load forwarding point, the information about the new-version VNF, such that the earlier service load forwarding point manages the new-version VNF and the earlier-version VNF.

18. The system according to claim 17, wherein the VIM is further configured to:
call an ExportVAPPInfoFromVLB interface to obtain the information about the new-version VNF from the new service load forwarding point; and
call an ImportVAPPInfoToVLB interface to configure, in the earlier service load forwarding point, the information about the new-version VNF.

* * * * *